United States Patent [19]

Holtje et al.

[11] Patent Number: 4,760,423
[45] Date of Patent: Jul. 26, 1988

[54] APPARATUS AND METHOD FOR REDUCING HYDROCARBON EMISSIONS FROM A LIQUID-BASED ELECTROPHOTOGRAPHIC COPYING MACHINE

[75] Inventors: Bruce E. Holtje, Castle Creek; David J. Keith, Endicott; Ming L. Fe, Ithica, all of N.Y.; James M. Halbert, Kaufman, Tex.

[73] Assignee: Savin Corporation, Stamford, Conn.

[21] Appl. No.: 25,124

[22] Filed: Mar. 12, 1987

[51] Int. Cl.⁴ .............................................. G03G 15/00
[52] U.S. Cl. ................................. 355/3 R; 355/10; 355/30; 55/387
[58] Field of Search ............... 355/3 R, 10, 30; 55/74, 55/387; 98/1

[56] References Cited

U.S. PATENT DOCUMENTS

| | | | |
|---|---|---|---|
| 3,130,079 | 4/1964 | Von Meister | 118/637 |
| 3,741,643 | 6/1973 | Smith et al. | 355/10 |
| 4,038,054 | 7/1977 | Graff | 55/179 |
| 4,261,716 | 4/1981 | Schwartz et al. | 55/387 |
| 4,304,577 | 12/1981 | Ito et al. | 55/179 |
| 4,377,331 | 3/1983 | Seelenbinder et al. | 354/300 |
| 4,397,663 | 8/1983 | Michlin et al. | 55/387 |
| 4,415,533 | 11/1983 | Kurotori et al. | 422/4 |
| 4,460,466 | 7/1984 | Winter | 210/274 |
| 4,466,813 | 8/1984 | Avritt et al. | 55/74 |

Primary Examiner—R. L. Moses
Assistant Examiner—J. Pendegrass
Attorney, Agent, or Firm—Biebel, French & Nauman

[57] ABSTRACT

A system for reducing hydrocarbon emissions from a high speed liquid reprography process. Hydrocarbon ladened vapors from the reprography process are directed through an activated charcoal bed. The bed is regenerated from time to time by a flow of controlled temperature regenerating air. Whereas the reprography process generates hydrocarbons at a highly fluctuating rate and mixed in large volumes of air, the carbon bed regeneration produces hydrocarbons at a controlled rate in a small volume of air. These hydrocarbons are removed by removal means which may be either a catalytic reactor or a condensation device.

10 Claims, 3 Drawing Sheets

APPARATUS AND METHOD FOR REDUCING HYDROCARBON EMISSIONS FROM A LIQUID-BASED ELECTROPHOTOGRAPHIC COPYING MACHINE

BACKGORUND OF THE INVENTION

It is well known that extremely high quality electrophotographic images may be produced through use of very small toner particles dispersed in a hycrocarbon liquid carrier. Liquid based machines can use much smaller toner particles than dry machines because the toner particles are trapped in the liquid. However, such use of hydrocarbon carrier liquids has an associated problem. The liquid carrier is highly volatile, and fairly high concentrations of hydrocarbon molecules enter the air in and around the copy machine during the copying process. Some of this is natural evaporation in and around the electrophotographic drum, some is from the dispensing and filtering of the liquid carrier and some is from evaporation of the liquid during fusing of the copy sheet. This creates a pollution problem which becomes increasingly severe with increasing usage of the copy machine. Therefore in the past liquid reprography has been limited to fairly slow, low volume copy machines. Typically these machines have operated at no more than about 30 copies per minute and have produced no more than about 6,000 copies per month. While many hydrocarbon emission abatement devices are available, their large size, large power consumption and/or large waste heat production makes them impractical for use with convenience copiers. Hence, a practical barrier exists for higher speed and/or higher volume copiers employing liquid based reprography.

A typical convenience copier may be situated within a fairly small room having a volume in the order of about 1,000 cubic feet. Such a room may have only about three air changes per hour. If such a room houses an electrophotographic copy machine using a liquid toner, it has been found that the air exhausted from the copy machine should contain less than about 50 ppm of hydrocarbon molecules. A concentration in excess of that figure will produce an undesirable pollution level. Prior art devices which have addressed this problem have met with more or less success for operation at relatively low copying rates or for relatively short periods of time. Typical prior art devices have utilized a condensation technique as shown in Von Meister U.S. Pat. No. 3,130,079, activated charcoal absorption as shown in Smith et al U.S. Pat. No. 3,741,643, and catalytic oxidation as shown in Kurotori et al U.S. Pat. No. 4,415,533. In accordance with the present invention it is desired to produce about 12,500 copies per month, either spread out evenly over a seven hour period each day, or in continuous intervals of 90 minutes each day at a speed of about 70 copies per minute. This results in hydrocarbon evaporation rates so high that over 1 pound of liquid carrier is released from the copier during daily usage. The above noted prior art systems are not capable of handling the pollution levels created by such high copying rates.

SUMMARY OF THE INVENTION

The present invention controls emission from a high speed liquid based electrophotographic copier by adsorbing the hydrocarbon vapors onto an activated charcoal bed and regenerating the bed over a period of time ranging from about one hour to eight hours. Polluted air resulting from such regeneration is treated for removal of the hydrocarbons either by catalytic oxidation or by condensation. The air which is used for regeneration is heated to a temperature ranging between about 100° C. and about 200° C. Regeneration may occur during evening hours when the machine is not being used for copying. Alternatively, the machine may time-share a pair of activated charcoal beds which are alternately regenerated.

It has been found that a charcoal bed comprising in the order of about 5 to 6 kg. of activated charcoal can adsorb up to 20% by weight of gaseous hydrocarbon vapors and provide adequate capacity to handle the aforementioned pollution levels. Such a bed may be satisfactorily regenerated at relatively low temperatures, if sufficient regeneration time is allowed. This avoids any possibility of ignition of the charcoal, and minimizes power requirements while providing the high peak adsorption rates available with activated charcoal.

Accordingly, it is an object of the present invention to provide a method and apparatus for controlling hydrocarbon emission from a liquid reprographic process. Other and further objects and advantages of the invention will be apparent from the following specification and the appended claims.

DESCRIPTION OF THE PREFERRED EMBODIMENT

Figure 1:
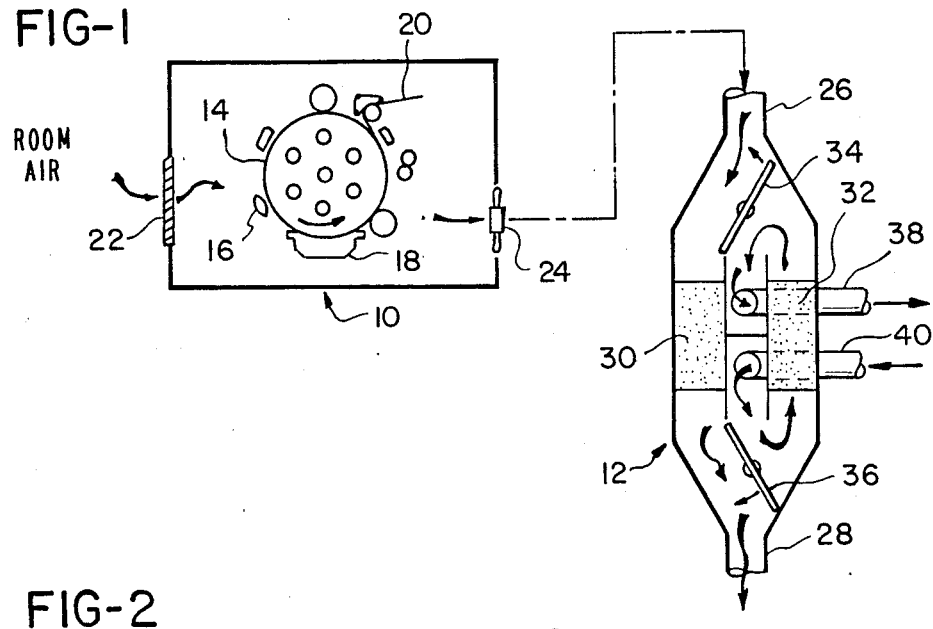
FIG. 1 is a schematic diagram of a pair of charcoal beds alternately adsorbing hydrocarbons generated by a liquid reprography process.

An emission reduction system in accordance with the present invention may be used with an electrophotographic copier 10 as illustrated in FIG. 1. Copier 10 is provided with an electrophotographic drum 14 which is charged in the usual manner and then exposed to an image provided by imaging optics 16 and other elements not illustrated in FIG. 1. The image produces selective area discharging of the drum 14 for causing transfer of toner particles from a liquid toner bath maintained within an appropriate receptacle 18. The toner particles which are transferred to the drum 14 are retransferred to an imaging sheet 20 in the manner well known in the prior art.

A variety of different toner solutions may be maintained within the receptacle 18, but they generally comprise carbon black dispersed in a volatile hydrocarbon solvent. A typical solvent is sold by Exxon Corporation under the trademark ISOPAR. For high speed liquid reprography of the type contemplated by this invention. Isopar H is particularly effective. Such a solvent produces hydrocarbon vapors which are entrained by air admitted through the copier air intake 22. The rate of air flow through intake 22 is necessarily large, about 50 to 100 CFM, to keep the copier cool enough to function. The polluted air is exhausted from copier 10 by an exhaust fan 24 and delivered to an adsorbing unit 12 via a duct 26.

Adsorbing unit 12 is equipped with a charcoal bed 30 for adsorbing hydrocarbon vapors from the airstream passing through duct 26. A first gate valve 34 directs the air from intake duct 26 through charcoal bed 30, and a second gate valve 36 directs the purified air into an outlet duct 28. Outlet duct 28 may discharge into the surrounding office environment, if desired. Preferably charcoal bed 30 contains 5 to 6 kg. of activated charcoal arranged to have a bed depth of no less than about 200 millimeters. A prefered charcoal is a bituminous charcoal sold by Calgon Corporation under the designation Calgon BPL 4×10. Many activated charcoals that are employed for commercial solvent recovery are also suitable. Typically copier 10 may produce about 6,250 copies per day, either spread out over a seven hour period or continuously at a speed of about 70 copies per minute. However, the exhaust air in exhaust duct 28 contains no more than about 10 ppm of hydrocarbon molecules.

At the end of an operating day charcoal bed 30 may be regenerated as hereafter described. However, in the preferred embodiment adsorbing unit 12 has a second charcoal bed 32 which may be used alternately with charcoal bed 30. In this way one charcoal bed may be regenerated while the other bed is servicing copier 10. For this purpose adsorbing unit 12 has a desorb inlet line 40 and a desorb outlet line 38. With gate valves 34, 36 positioned as indicated in FIG. 1, charcoal bed 32 is being regenerated while charcoal bed 30 is purifying the exhaust from copier 10. During an adsorption cycle polluted air flows downwardly through the charcoal bed. During a desorption cycle heated regenerating air flows upwardly through the bed. Gate valves 34, 36 may be repositioned to cause regeneration of charcoal bed 30, while charcoal bed 32 takes over the adsorbing function.

Figure 2:
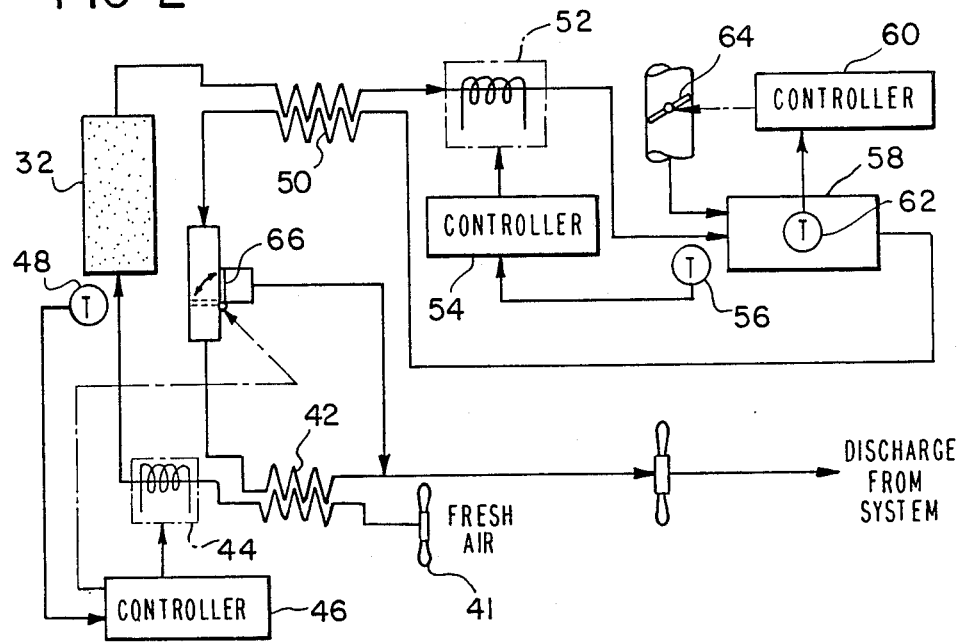
FIG. 2 is a schematic diagram of apparatus for desorbing a charcoal bed and catalytically oxidizing the hydrocarbons generated by desorption.
Figure 3:
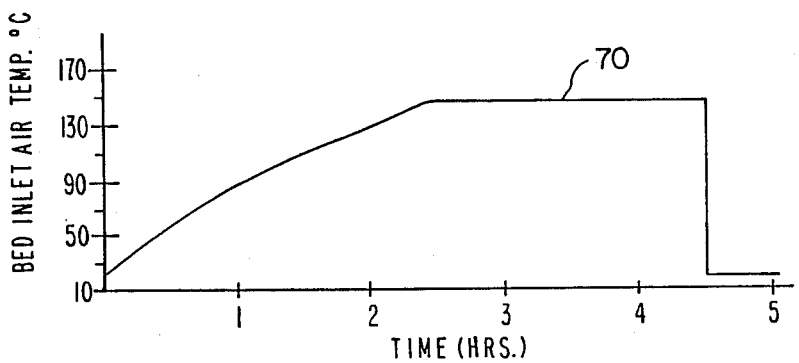
FIG. 3 is a diagram of a preferred temperature profile for inlet air used for desorption of the charcoal bed of FIG. 2.

Regeneration of a charcoal bed may be accomplished through use of apparatus as disclosed schematically in FIG. 2. For such regeneration a fan 41 supplies fresh air to charcoal bed 32 via a heat exchanger 42 and a heater 44. Heat exchanger 42 preheats the fresh air while heater 44 brings it up to a temperature indicated by the line 70 of FIG. 3. The inlet air temperature for the bed being regenerated is elevated gradually to about 150° C. over a period of about 2½ hours. Preferably that temperature is held for no more than two more hours, after which regeneration of the bed is complete.

Figure 4:
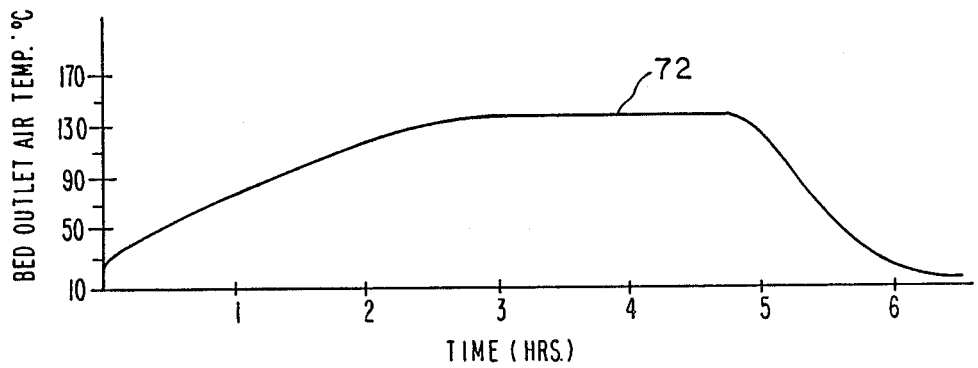
FIG. 4 is a diagram of the profile of the outlet air temperature from the charcoal bed of FIG. 2 when the inlet air temperature corresponds to the profile of FIG. 3.
Figure 5:
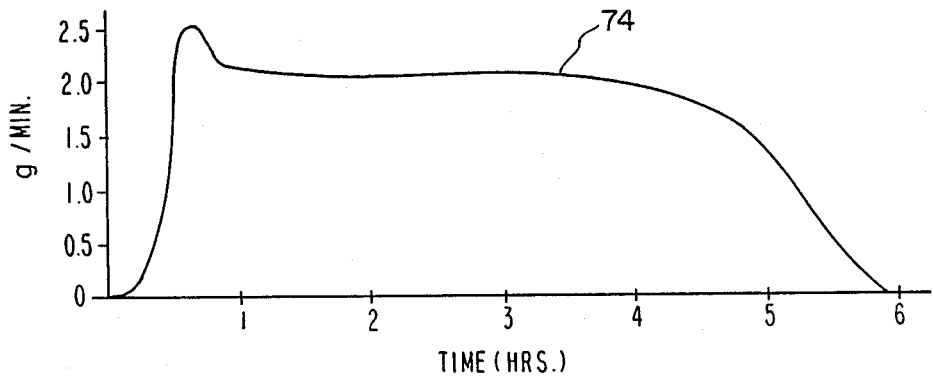
FIG. 5 is a profile of the hydrocarbon desorption rate for the charcoal bed of FIG. 2 when supplied with inlet air at a temperature profile in accordance with FIG. 3.

The air being supplied by fan 41 is at near atmospheric pressure, and it is important to control the air temperature so as to avoid ignition of the charcoal. Preferably the peak air inlet temperature should range between about 100° C. and 200° C. and should be maintained in that range for a period of time between one hour and eight hours. For a temperature profile as illustrated by the line 70 of FIG. 3, the bed outlet air has a temperature profile as indicated by the line 72 of FIG. 4. The concentration of hydrocarbon molecules in the outlet air follows a profile as generally illustrated by the line 74 of FIG. 5. Desorption of the hydrocarbon molecules begins when the outlet air temperature reaches 35° C., as evidenced by the steep "jump" on line 74.

A controlled temperature profile for the bed inlet air is afforded by a controller 46 using temperature information generated by a temperature sensor 48. Controller 46 also controls the positioning of a control valve 66 connected for directing preheating air through heat exchanger 42.

After its desorbing flow through the charcoal bed, the hydrocarbon laden air flows through a heat exchanger 50, a super heater 52 and a catalytic reactor 58. Catalytic reactor 52 oxidizes the hydrocarbon molecules through contact with an oxidation catalyst which may be any of a number of different materials as taught in Kurotori et al. U.S. Pat. No. 4,415,533. Preferably the hydrocarbon laden air is supplied to catalytic reactor 58 at a temperature in a range from about 200° C. to about 250° C. This temperature is regulated in accordance with the minimum activation temperature of the catalyst used. It will be appreciated that catalytic reactor 58 treats an airstream having a pollution level characterized by the smooth profile of FIG. 5 and need not cope with the highly fluctuating pollution levels which may characterize the air being exhausted from copier 10. Also, the air flow rate through catalytic reactor 58 is only about 5 CFM.

The oxidation of the hydrocarbon pollutants within catalytic reactor 58 is an exothermic reaction which under these conditions produces about 1.5 KW of heat and greatly increases the temperature of the airstream. A temperature sensor 62 measures the temperature within catalytic reactor 58 and supplies a control signal to controller 60. Controller 60 controls the positioning of a fresh air injector valve 64 so as to avoid overheating the catalytic reactor. (preferred maximum substrate temperature is about 500° C.).

Heated outlet air from catalytic reactor 58 is supplied to heat exchanger 50 for preheating the vapor laden air prior to its passage through super heater 52. A temperature sensor 56 measures the temperature of the air prior to its entry into catalytic reaction 58 and supplies a control signal to controller 54. Super heater 52 operates under control of controller 54 and is used only as necessary. The catalytic reactor generally supplies all the heat needed.

After its passage through heat exchanger 50, the oxidized airstream flows through heat exchanger 42 for preheating the fresh air supplied to the charcoal bed undergoing regeneration. However, depending upon the temperature measured by temperature sensor 48, controller 46 may operate control valve 66 to cause the flow of oxidized air to bypass heat exchanger 42 and to discharge from the system. This avoids overheating of the charcoal bed.

Figure 6:
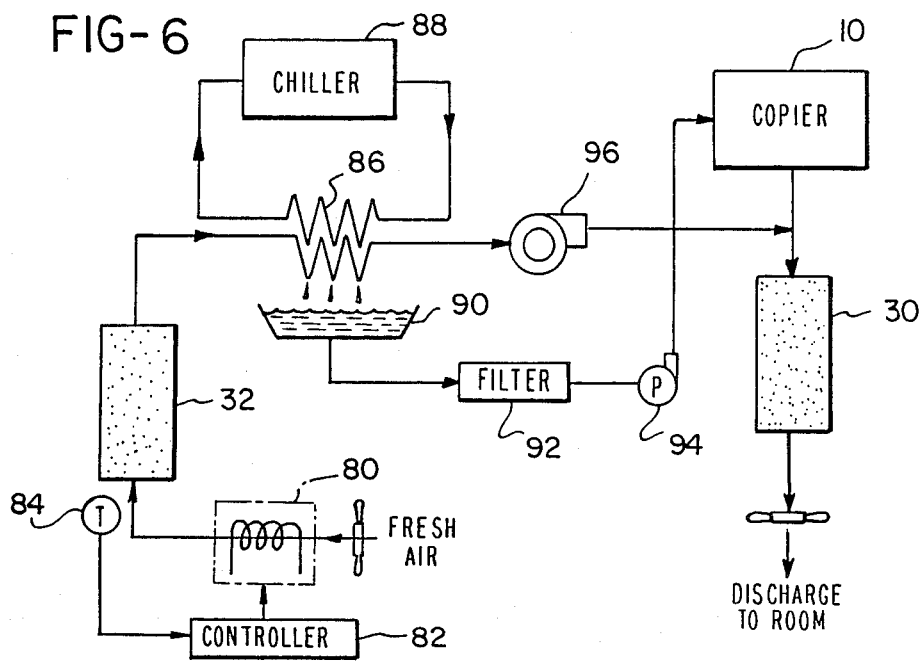
FIG. 6 is a schematic diagram of apparatus for desorbing a charcoal bed and recovering the desorbed hydrocarbons by condensation.
Figure 7:
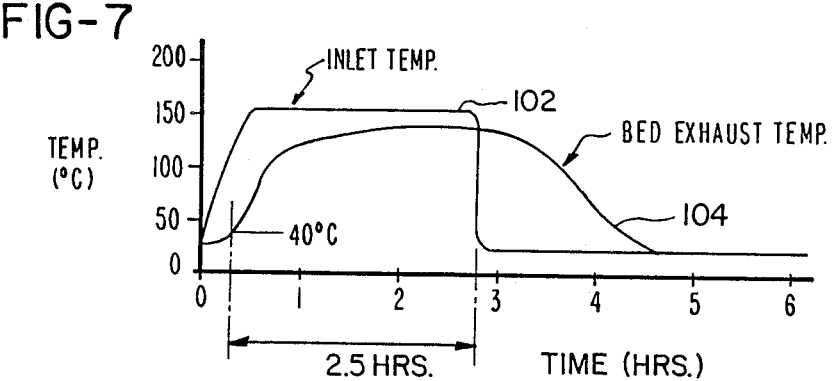
FIG. 7 is a diagram of preferred inlet and exhaust temperature profiles for the charcoal bed of FIG. 6.
Figure 8:
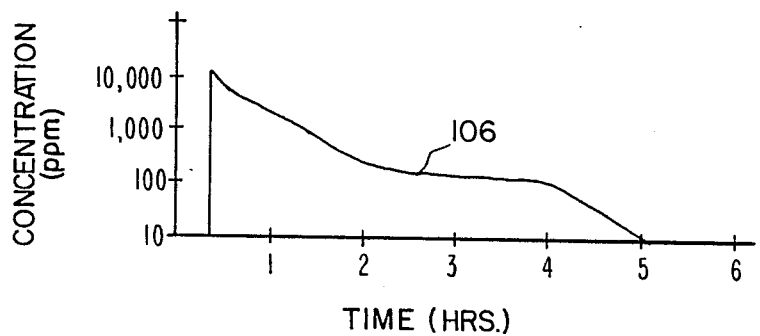
FIG. 8 is a diagram showing the profile of hydrocarbon concentration in the air from the charcoal bed of FIG. 6 when desorbed in accordance with the temperature profiles of FIG. 7.

FIG. 6 illustrates an alternative embodiment of the regeneration system. As in the embodiment of FIG. 2, the system includes a heater 80 operating under control of a controller 82 and a temperature sensor 84. Controller 82 maintains the inlet temperature along a profile as illustrated generally by the line 102 of FIG. 7. The temperature rises somewhat more rapidly than for the embodiment of FIG. 2. However, there is again a leveling off at a temperature of about 150° C., and this temperature is maintained for about 2½ hours. The corresponding bed exhaust temperature is illustrated by the line 104 of FIG. 7, while the hydrocarbon concentration in the exhaust air is illustrated by the line 106 of FIG. 8. Under these conditions, very large concentrations of hydrocarbon vapor are entrained in the very small air volume used to desorb the activated charcoal bed. This concentrating of the hydrocarbon is important to achieve high condensation efficiencies.

After being exhausted from the charcoal bed, the regenerating air flows through a heat exchanger 86 for condensation of the hydrocarbon solvent. The solvent is collected in a collection vessel 90 and is filtered by a filter 92. A pump 94 then pumps the collected solvent back to copier 10 for reuse. The condensate which is so collected has been found to be exceedingly pure. Gas chromatograms of collected ISOPAR H have been compared with those for the starting product and were seen to be nearly indistinguishable. No observable isomeric shifts were noted.

A chiller 88 is also connected to heat exchanger 86 so as to reduce the temperature of the air exhausted from the charcoal bed and to produce the desired condensation. It is important to note that the temperature of heat exchanger 86 should be maintained above freezing so as to avoid blockage thereof by frost or ice from water vapor in the air stream and resultant overheating of charcoal bed 32. It will be appreciated that chiller 88 has a condenser (not illustrated) which generates heat. This condenser may be used as a preheater for the fresh air being directed toward hearter 80. For the purpose herein contemplated heat exchanger 86 may be a rather small device having an interior volume less than about 0.2 ft$^3$. Chiller 88 may also be a small unit drawing only about 200 watts of power. Such an arrangement will remove over 65% of the hydrocarbons from the regenerating air. A blower 96 directs the exhaust air from heat exchanger 86 through the operating charcoal bed 30 prior to discharge into the surrounding environment. The resulting pollution level is less than 10 ppm.

While the method herein described, and the forms of apparatus for carrying this method into effect constitute preferred embodiments of this invention, it is to be understood that the invention is not limited to this precise method and forms of apparatus, and that changes may be made in either without departing from the scope of the invention, which is defined in the appended claims.

What is claimed is:

1. For use with an electrophotographic copy machine comprising means for creating an electrostatic image of an original document and liquid toner means for transferring said image to a copy sheet, emission control means comprising:
    emission collection means for collecting excess hydrocarbon vapors generated by said machine,
    an activated charcoal bed for receiving said vapors and adsorbing the hydrocarbons therefrom during an adsorption cycle,
    means for enabling passage of said vapors to said bed during said adsorption cycle,
    air intake means for collecting a flow of regenerating air, heating said air to a temperature ranging between about 100° C. and 200° C., and delivering said air to said bed during a desorption cycle,
    temperature control means for controlling said temperature to rise to said range and remain within said range for a period of time between about 1 hour and 8 hours to cause desorption of said hydrocarbons from said bed into said air at a relatively uniform rate, and
    hydrocarbon removal means for receiving said air in its hydrocarbon laden state and removing said hydrocarbons therefrom.

2. Apparatus according to claim 1 wherein said hydrocarbon removal means comprises catalytic oxidation means.

3. Apparatus according to claim 1 wherein said hydrocarbon removal means comprises condensation means.

4. Apparatus according to claim 1 wherein said bed contains about 5 to 6 kgs. of activated charcoal.

5. Apparatus according to claim 2 and further comprising:
    air exhaust means for carrying said air from said bed through said catalytic oxidation means so that hydrocarbons desorbed from said bed into said air may be oxidized, and
    heat exhanger means for extracting heat from said air after passage through said catalytic oxidation means and transferring said heat back into said air at a point prior to entry into said bed.

6. Method of controlling emission of hydrocarbon vapors from an electrophotographic copy machine of the type using a liquid toner comprising the steps of:
    passing a flow of air through said machine to collect said vapors,
    adsorbing hydrocarbons from said air into a bed of activated charcoal,
    regenerating said bed by passing a flow of regenerating air therethrough at near atmospheric pressure and at a temperature ranging from about 100° C. to about 200° C.,
    continuing said regenerating flow for a period from about 1 hour to about 8 hours,
    removing hydrocarbons from said regenerating air at a controlled rate by catalytic oxidation, and
    using heat generated by said catalytic oxidation to warm said regenerating air prior to its passage through said bed.

7. Method according to claim 6 wherein said regenerating air flows through said bed at a rate of about 5 CFM.

8. For use with an electrophotographic copy machine comprising means for creating an electrostatic image of an original document and liquid toner means for transferring said image to a copy sheet, emission control means comprising:
    emission collection means for collecting excess hydrocarbon vapors generated by said machine,
    an adsorbing unit including first and second activated charcoal beds for alternately receiving said vapors and adsorbing the hydrocarbons therefrom,
    air intake means for collecting a flow of regenerating air and delivering said air to that one of said first and second charcoal beds which is not receiving said vapors,
    gate means for selecting one of the said charcoal beds for receiving said vapors and causing said regenerating air to flow through the other one of the charcoal beds,
    heating means for heating said regenerating air to a temperature ranging between about 100° C. and 200° C., control means for controlling said temperature to rise to said range and remain within said range for a period of time between about 1 hour and 8 hours, and hydrocarbon removal means for receiving regenerating air from said other one of said charcoal beds and removing hydrocarbons therefrom.

9. Apparatus according to claim 8 wherein said hydrocarbon removal means comprises condensation means, said apparatus further comprising means for delivering condensed hydrocarbons from said hydrocarbon removal means to said electrophotographic copy machine.

10. Apparatus according to claim 9 further comprising means for directing said regenerating air from said hydrocarbon removal means to that one of said charcoal beds which is connected for adsorbing hydrocarbon vapors generated by said electrophotographic copy machine.

* * * * *